(12) United States Patent
Watkins

(10) Patent No.: US 6,503,306 B1
(45) Date of Patent: Jan. 7, 2003

(54) COMPOSITION FOR IMPREGNATING POROUS MATERIALS, PREPARATION AND USE THEREOF

(75) Inventor: John Bernard Watkins, Rowville Vic (AU)

(73) Assignee: Monash University Act 1958, Clayton (AU)

( * ) Notice: Subject to any disclaimer, the term of this patent is extended or adjusted under 35 U.S.C. 154(b) by 0 days.

(21) Appl. No.: 09/646,585

(22) PCT Filed: Mar. 22, 1999

(86) PCT No.: PCT/AU99/00194
§ 371 (c)(1),
(2), (4) Date: Nov. 27, 2000

(87) PCT Pub. No.: WO99/48656
PCT Pub. Date: Sep. 30, 1999

(51) Int. Cl.[7] ............................. B27K 3/34; B27K 3/36; A01N 27/00
(52) U.S. Cl. ................. 106/15.05; 106/277; 106/281.1; 106/283; 106/284; 424/405; 427/298; 427/393; 427/442; 514/762
(58) Field of Search ............................ 106/15.05, 277, 106/281.1, 283, 284; 424/405; 514/762; 427/298, 421, 428, 429, 442, 393

(56) References Cited

FOREIGN PATENT DOCUMENTS

| AU | 7042887 | 9/1987 |
|----|---------|--------|
| DE | 29617062 | 3/1998 |
| EP | 227430 | 7/1987 |
| WO | 8500040 | 1/1995 |

*Primary Examiner*—Anthony J. Green
(74) *Attorney, Agent, or Firm*—James Ray & Associates

(57) ABSTRACT

Composition for impregnating porous materials, in which the composition contains at lease one component having preservative properties or which release a component having preservative properties on heating, the composition comprising an emulsion of water and oil containing a primary surfactant and an amphoteric additive, the pH of the emulsion being equal or approximately equal to the iso-electric point of the amphoteric additive. The compositions of the invention are particularly useful in the preservation of timber.

17 Claims, No Drawings

COMPOSITION FOR IMPREGNATING POROUS MATERIALS, PREPARATION AND USE THEREOF

This invention relates to compositions of the oil and water emulsion type for the impregnation of porous materials. The compositions of the invention are particularly useful in the preservation of porous materials such as timber.

BACKGROUND OF THE INVENTION

Known compositions of the above type in particular those which use creosote or protecting agent based on tar oil have turned out to the very disadvantageous since especially in case of the impregnation of timber a so-called "bleeding" occurs after completion of the impregnation process This bleeding occurs for example due to the influence of weather, particularly in hot weather, and during repair and may persist for years. During this bleeding oil diffuses to the surface of the impregnated material. Thus, for example, greasy tar coatings form at the timber surface, if composition containing tar oils are used for impregnation. These tar coatings can cause problems during the handling of the timber and can have an unhealthy effect when getting in contact with the skin, at least they can cause irritations of the skin and, due to volatile components of the oil, also the eyes. As the timber surface will never become completely dry these drawbacks will always remain.

The bleeding of the impregnated timber is substantially enhanced by heating of the timber during exposure to sunlight. The emissions of the timber, which especially occur then, can cause the skin of sensitive persons to become red, similar to a sunburn.

It has been proposed to avoid these drawbacks by using pigment-stabilised emulsions, in which it appears that the pigments block diffusion of the oil. The mechanism which is the basis for the blocking is not yet exactly understood, however, there are indications that it is the large contact angle between the oil and the discrete pigment particles, which are embedded within the microstructure of a material treated under pressure. Thereby wetting of the pigments by the oil becomes more difficult or even impossible, since no coalescence of the pigment particles occurs during the impregnation process or when the emulsion breaks and lipophobic particles become embedded within the pore structure of the material being treated.

The invention addresses the problem to provide an impregnation means that penetrates very easily into the substrate to be treated, that distributes well in this substrate and reduces or eliminates the bleeding of oil very effectively from the impregnated material.

THE PRESENT INVENTION

The present invention provides composition for impregnating porous materials, in which the composition contains at least one component having preservative properties or which releases a component having preservative properties on heating, the composition comprising an emulsion of water and oil containing a primary surfactant and an amphoteric additive, the pH of the emulsion being equal or approximately equal to the iso-electric point of the. amphoteric additive.

In one aspect of the invention the emulsion contains at least one amphoteric additive which does not act as an emulsifier. In case only one amphoteric additive is present, the pH-value of the emulsion is equal or nearly equal to the iso-electric point of the amphoteric additive. If the emulsion contains several amphoteric additives, the pH-value of the emulsion is adjusted so that it is within or nearly within the range of the iso-electric points of the additives, i.e. the pH-value is adjusted so that it is optimised with respect to the iso-electric points of the additives. This can be achieved for example by adjusting the pH-value to be equal to the mean value of the various iso-electric points. However, if the amphoteric property of one of the additives is of an especially high importance the pH-value can also be equal to the iso-electric point of this additive or be close to the iso-electric point thereof, respectively. With regard to this it is to be considered that such an additive also at a pH-value of the emulsion which is not exactly, however nearly equal to the iso-electric point, exhibits the property of the electrical neutrality in so far as the additive component always comprises a portion of particles which appear neutral, and always a portion of particles which do not appear neutral. In this case the amount of the respective portion is dependent on the pH-value of the emulsion. At the pH-value of the emulsion which is equal to the iso-electric point, the portion of the particles which do not appear neutral is zero.

Thus, it is achieved that the additive or the additives appear electrically neutral or nearly electrically neutral, respectively. Since in general the material to be treated is charged, in this way it can be achieved that the additives penetrate better into the material. An undisturbed flow of additives can take place within the micro-structure of, for example, timber types or materials based on timber, without coalescence occurring, i.e. an accumulation of additives. Thus, the additive particles can be embedded individually into the micro-structure of the materials being treated, in fact discretely when the emulsion breaks.

Especially, this impregnation according to the invention is very advantageous in the treatment of timber. Since timber is charged negatively, for this reason during the application of conventional impregnation means several parameters have to be observed. Using the impregnation means according to the invention, with regard to these parameters now a simplification and considerable improvement is achieved. Thus it is possible to apply the impregnation means according to the invention with a smaller pressure and during a shorter period of treatment. Furthermore, also the temperature of the impregnation means can be decreased, because due to the reduction or elimination of electrical interaction between the timber and the penetrating additive, one can work with a higher viscosity of the impregnation means. Thus the substrate can be impregnated with substantially less consumption of energy and time.

The additives can be particles which consist of two or more constituents, of which one is an amphoteric surfactant. In this case the amphoteric property of the additive is given by the surfactant. The surfactant promotes the penetration and the distribution of the additive within the material to be treated.

The impregnation means according to the invention develops its advantageous properties especially if a pigment is used as amphoteric additive. The amphoteric property can be achieved in that the pigment is surface activated with an amphoteric surfactant, or in that the pigment itself is amphoteric.

Because of the fact that the pigment appears uncharged, its property is enhanced to prevent the outflow of oil from the inside of the material to be treated to the surface thereof. The reason for this could be that the contact angle is increased, whereby a wetting of the pigment by the oil is still further decreased. Moreover, due to this neutrality the pigment does not react with water or other chemicals contained within the material to be treated, so that the lipophobic property and thus the effect to block the outflow of oil out of the material is not impaired. This is the case both when the water contained in the emulsion evaporates quickly after the treatment of the material, and when the emulsion is broken by the evaporation of the water but also through external influences—as for example rain—water gets to the surface of the treated material. In both cases the pigment does not react with the water, i.e. it remains dry and fully keeps its property to block the outflow of oil, even if the pigment is recharged in the course of time.

Instead of the pigment also an inert filler or several fillers can be constituents of the emulsion. This inert filler exhibits essentially the same advantages as the pigment and can also be activated either with an amphoteric surfactant or can itself be amphoteric. With regard to the positive effect concerning the prevention of outflow of oil from the material to be treated the same is valid as for the pigment.

In the case that the pigment or the inert filler, respectively, is itself amphoteric it is nevertheless very advantageous if the pigment or the inert filler, respectively, is surface-activated.

The surface activation is achieved by applying a surfactant onto the pigment or the inert filler, respectively. This can be done by a pre-coating with the activator, whereby the pigment or the inert filler, respectively, is pre-coated by a pre-treatment with the activator. Furthermore, the surface activation can be done by adsorption of the activator or by a chemical reaction with the activator.

The effect of a surface activation can also be achieved by using a structure-forming agent. Such an agent is for example polyacrylic acid. It converts water into a gel and thus changes the rheological behaviour of the water.

Further impregnation means according to the invention may contain at least one component which is non-ionic at a certain pH-value but which otherwise is ionic. For this impregnation means according to the invention the pH-value of the emulsion is essentially adjusted so that the zero point of charge, i.e. the pH-value at which the component is non-ionic, is reached. If the emulsion contains several such components the pH-value of the emulsion is adjusted so that it is in the range of the pH-values at which each of these component have their zero-point of charge, respectively. The criteria for the adjustment of this pH-value are the same as for the adjustment of the pH-value of the above described impregnation means according to the invention which contains several amphoteric additives. Thus, also here an optimization of the adjustment of the pH-value of the emulsion takes place, under evaluation of the importance of the respective non-ionic properties of the diverse components. Thereby it is to be considered that such a component exhibits a non-ionic property also at a pH-value of the emulsion which does not exactly correspond to the zero-point of charge, but nearly corresponds to it, since the component always comprises a portion of particles which are non-ionic and always a portion of particles which are ionic, whereby the amount of the respective portions is dependent of the pH-value of the emulsion. At the pH-value of the emulsion which corresponds to the zero-point of charge the ionic portion is equal zero.

With this further impregnation means according to the invention, which is described in the following, a considerably improved penetration into the material to be treated, as e.g. timber, is achieved by the fact that one or several components are non-ionic in the above described sense and the pH-value is adjusted so that the components are electrically neutral. The considerably improved penetration may be due to the fact that no or only a small electrical interaction of the non-ionic components with a charged material to be treated takes place.

The impregnation means develops its advantages especially well if it exclusively contains electrically neutral components. As above described, the electrical neutrality can be caused by the fact that the component has a zero-point of charge at a certain pH-value which is adjusted, or by the fact that components are used which are non-ionic generally, i.e. independently from the pH-value of the emulsion are non-ionic, or that some components are amphoteric and the pH-value of the emulsion is optimized under consideration of the amphoteric property.

The emulsion of the impregnation means can have particles as non-ionic components which consist of two or more constituents, of which one is a surfactant which represents a means for an as effective as possible dispersion for an accurate adjustment of the pH value and for the production of the zero-point of charge on the dispersed particles. Preferably all particles or at least a portion of the particles consist of a pigment or an inert filler which is provided with such a surfactant. At the same time the pigment or the inert filler is activated and dispersed by the surfactant within the narrow pH range, thus ensuring that the particles assume their zero-point of charge in their dispersion medium.

It can also be considered that the emulsion of the impregnation means has a non-ionic pigment or a non-ionic filler as components with a zero-point of charge. This pigment of this inert filler, respectively, is again preferably surface-activated.

Both in case of utilization of a pigment and in case of utilization of an inert filler, due to the electrical neutrality, again not only a good penetration into the material to be treated is assured, but also a high efficiency with regard to the effect that the pigment or the inert filler, respectively, prevents a diffusion of the oil portion out of the emulsion.

In both impregnation means according to the invention the active substances protecting the material to be treated are for example in the oil phase. However, they can also be in the water phase, in both phases or between the two phases, i.e. within an encasing coating of the emulsion droplets (so-called interphase). This is especially of advantage if the impregnation oil portion is to be reduced by applying other corresponding toxicants. Then the water portion of the emulsion can increase with the reduction of the oil portion. The toxicants can be introduced on carrier particles.

In both the impregnation means preferably all various forms of titanium dioxide and various forms of iron oxide are used as pigments. The iron oxides can be synthetic or natural ones. whereby natural iron oxides are preferred. Precoated titanium dioxide is especially suitable. The pigments or the pigment particles, respectively, should not be greater than one micrometer in order to achieve a good penetration and distribution in the material to be treated which are as good as possible.

Mixed types of particles may produce additional advantages. In both impregnation means preferably silicon, borytes, boron sulphate, calcium sulphate, pigments of a common type, calcium carbonate, wood flour, various non-swelling clays, fly ash, bauxite wastes, various inert minerals and aggregates are used as inert fillers. Again, the inert fillers or the particles which comprise an inert filler as constituent should not be greater than one micrometer in order to achieve the best possible penetration and distribution in the material to be treated.

Preferably the emulsions contain the impregnation oil creosote. This is a coal tar oil which has been proved effective as a timber protecting substance for 150 years. However, also a number of other active substances for timber protection are possible. Thus active substances for timber protection are preferably chosen from the following list of active substances:

coal tars, oil slade tars, timber tars as e.g. beech timber tar oil, bitumen and derivates thereof, waxes, natural resins, synthetic resins, resin derivates of petroleum, latexes, polymers, drying agents, antioxidation agents, vegetable oils as e.g. rape-seed oil, mineral oils, petroleum oils, synthetic oils, fungicides, insecticides and bacteriocides.

Further the impregnation means can contain fixing agents. These are known from the production of dyes and produce an improved surface sealing by chemically bonding water. By fixing agents for example the moisture contents of treated timber is stabilized, i.e. it is achieved that the timber does not dry out later. Thereby the equilibrium of timber moisture is guaranteed and a later occurring fissuring and shrinking is avoided. The fixing agents can also be applied when materials other than timber are to be treated. The fixing agents can be oil curing or water soluble. Possible fixing agents are e.g. epoxy resins and urethanes, natural and/or synthetic drying agents.

Additives and components can further be for example: liquefiers for reduction of the process of crystallizing out as well as for improvement of liquefaction, agents for changing—especially for decreasing—the viscosity, anti-skinning-agents, UV-irradiation absorbers, wetting agents, softening agents, drying delaying agents, thixotropic agents, rheopectic agents, structure forming agents and/or gelling agents, polysaccharides, lattice structure forming agents (polymer initiators), dyes, optical brightening agents, anti-settling agents, pigment-free dyes, micronized metal particles, metal soaps, metal salts, metallic complexes and catalysts for hydrogenating.

Preferably both impregnation means contain thermal hardeners. These thermal hardeners are activated by influence of thermal energy and have the effect that the treated material obtains additional stability with respect to deformation or fissure formation. Thermal hardeners are e.g. phenol resins, isocyanates which are blocked by phenol monomethylmethacrylates.

It is also possible to chemically bond micronized cement particles in the material to be treated in order to achieve a stabilisation of the dimensions. From this an improved strength of the materials results. Also silicon can be used for this purpose.

It may also be provided that the impregnation means contain one or more surfactants with a zero-point of charge, by virtue of which the emulsion or the dispersion produced can be advantageously influenced with regard to a zero-point of charge.

In the compositions of the invention the water proportion can be for example 99,5% and the oil proportion 0.5%. However, the ratio of both portions can also be inverted or any other ratio is possible. As co-emulsifiers fluoro carbons can be used.

Additionally to the good penetration and distribution properties and the property to prevent bleeding, the impregnation means according to the invention exhibit the further advantages of an improved surface sealing, a faster drying especially within a phase of application of a vacuum which the process of impregnation, an improved depth-effectiveness, an improved odour reduction and an improved impregnation agent efficiency.

The impregnation means can be applied for example by painting, rolling, spraying, immersing, immerse-diffusion, sucking up or sap displacement method of impregnation at ambient temperatures or high temperatures. The sap displacement method of impregnation can be applied under low or high pressure. The boiler-pressure method, using a pressure, vacuum and temperature control, is suitable for the impregnating means.

In the following the invention is described in more detail referring to specific embodiments.

| Example 1 | Parts by weight |
|---|---|
| Water | 200.00 |
| Creosote | 600.00 |
| Triamphoram ® CPI | 6.00 |
| Pigment Yellow (GLB 3190) | 20.00 |
| $H_3PO_4$ | 2.00 |

Triamphoram® CPI is a tradename for the compound N-copra dipropylene triamino propionic acid in mono ethylene glycol solution. This compound is an amphoteric surfactant.

The emulsion was produced under the influence of high shear forces by utilizing an ULTRA TURRAX® T25 —homogeniser. The resulting emulsion is a water-in-oil-emulsion and has a final pH-value of 6.18 at 22.0° C. adjusted by means of the phosporic acid. The emulsion was produced at 65° C. It exhibits an excellent droplet size and droplet range (5 to 20 μm) and has proved to be stable and homogenous. The droplet size was determined using a microscope at a magnification of 400.

| Example 2 | Parts by weight |
|---|---|
| Water | 200.00 |
| Creosote | 600.00 |
| Carbopol ® 674 | 0.80 |
| Armeen ® CD | 1.00 |
| Pigment Yellow (GLB 3190) | 20.00 |
| $H_3PO_4$ | 2.30 |

Carbopol® 674 is a tradename for a high molecular weight polyacrylic acid, which is crosslinked with polyalcenol ether.

The emulsion was produced under the influence of high sheer forces utilizing an ULTRA TURRAX® T25 homogeniser. The resulting emulsion is a water-in-oil-emulsion and has a final pH-value of 6.21 at 32.4° C. adjusted by means of the phosphoric acid. The emulsion was produced at 65° C. It exhibits a medium to very fine droplet size of 2 to 20 μm, with most droplets in the 3 to 10 μm range. The droplet size was determined using a microscope at a magnification of 400. The emulsion is stable and homogeneous.

| Example 3 | Parts by weight |
|---|---|
| Water | 539.50 |
| Creosote | 2158.00 |
| Carbopol 672 | 2.02 |
| Carbopol 674 | 2.02 |
| Titanium Dioxide TiONA ™ RCL 666 | 94.41 |
| Potassium Hydroxide (10.0% solution) | 4.05 |

This emulsion was produced under conditions of ultra high shear as a result of gradual addition of the oil phase to the water phase with increasing shear to maximum, utilizing an Ulta Turrax™ 45. The pH was adjusted to 6.60 by further addition of 6.0 mLs Potassium hydroxide, 10% solution, which is approximately equal to the iso-electric point of the titanium dioxide. A very stable emulsion was produced, droplets ranging from 5 micron to 65 micron, predominantly 5 micron to 20 micron, determined utilizing an optical microscope at 400× magnification. Haematocrit slides were used. Long term storage with heating and cooling cycles evidenced no instability.

| Example 4 | Parts by weight |
| --- | --- |
| Water | 700.00 |
| Creosote | 2100.00 |
| FC 99 | 1.40 |
| Carbopol ™ 674 | 2.80 |
| Titanium dioxide TiONA ™ RCL 575 | 98.00 |
| Potassium Hydroxide (10.0% solution) | 3.00 |

This emulsion composition was produced under similar conditions to that detailed above and utilizing the same equipment. An extremely homogeneous emulsion was produced exhibiting droplets ranging from 3 micron to 35 micron determined as described above. The pH was 6.28 and no adjustment was required. No instability evidenced itself during long term storage, as well as heating and cooling.

FC 99 is a fluorinated hydrocarbon, non ionic surfactant, based upon $CF_3(CF_2)$-Z where Z is a solubilizing group.

| Example 5 | Parts by weight |
| --- | --- |
| Water | 200.00 |
| Creosote | 600.00 |
| Ultrez 10 ™ polymer | 2.00 |
| Armeen ™ CD | 2.75 |
| Titanium dioxide TiONA ™ RCL 575 | 30.00 |

This emulsion composition was produced under high shear utilizing an Ultra Turrax T45 equipped with fine generators. A very fine, homogeneous emulsion was produced, exhibiting disperse phase droplets ranging between 2 micron to 25 micron, predominantly less than 15 micron.

The emulsion exhibited excellent stability over long standing and after repeated heating and cooling cycles. The disperse phase was particle sized utilizing special dished slides in an Olympus™ microscope at 400× magnifications Ultrez 10™ polymer is a crosslinked polyacrylic acid.

Armeen™ CD is one of a group of aliphatic long-chain amines.

The polyacrylic acid was neutralized with the amine very precisely, to ensure that no net charge existed on the titanium doxide particles which were dispersed extremely homogeneously at their I.E.P. pH was 6.25 at 20.0° C.

| Example 6 | Parts by weight |
| --- | --- |
| Creosote | 360.00 |
| Water | 1440.00 |
| FC 99 ™ | 2.70 |
| FC 430 ™ | 1.35 |
| Titanium dioxide TiONA ™ RCL 535 | 67.50 |

FC 430 is a fluorinated hydrocarbon surfactant of the type $CF_3(CF_2)$-Z.

This emulsion was produced under conditions of ultra high shear, utilizing an Ultra Turrax™ T 45 equipped with fine generators. The FC 99 was added to the prepared water phase and the FC 430 was added to the oil phase prior to emulsification at 65° C. A very homogeneous emulsion was produced. The disperse phase droplets ranged in size from 2 micron to 20 micron as measured in the Olympus microscope, utilizing carefully prepared Haematocrit slides to ensure that no stress or droplet distortion is induced in the emulsion sample during this analysis. This emulsion withstood heating and cooling cycles during long term storage which induced no evidence of instability, assessed in each case, both visually and microscopically. This non ionic emulsion was analysed for pH which was 6.28 at 25° C. which confirmed zero point of charge on the sub-micron titanium dioxide particles.

| Example 7 | Parts by weight |
| --- | --- |
| Water | 360.00 |
| Creosote | 1440.00 |
| Teric ™ 17 A 2 | 21.60 |
| FC ™ 99 | 2.70 |
| Iron oxide sub-micron precipitated particles | 67.5 |

This emulsion was produced under conditions of ultra high shear, utilizing an Ultra Turrax™ equipped with fine generators. The 17A2 non ionic surfactant was dissolved with heating in the oil phase. The FC 99 was dissolved in the water phase in which the sub-micron red iron oxide particles were dispersed prior to emulsification. The oil phase was heated to 65.0° C. and it was added into the water phase with increasing shear to maximum shear at 10,000 r.p.m., rotor shaft speed.

A very fine, homogeneous emulsion was produced and this emulsion has withstood very long term storage, which included heating and cooling cycles, with no evidence of instability either visually or microscopically. Disperse phase droplet size ranged from 2 micron to 23 micron, predominantly under fifteen micron. pH was determined to be 6.37 at 21.5° C. which ensures zero point of charge on the homogeneously dispersed, sub-micron iron oxide particles.

Teric™ 17A2 is an aromatic-oil soluble surfactant which is derived from cetyl-oleyl alcohol ethoxylated with two moles of ethylene oxide.

The claims defining the invention are as follows:

1. Composition for impregnating porous materials, in which the composition contains at least one component having preservative properties or which releases a component having preservative properties on heating, the composition comprising an emulsion of water and oil containing a primary surfactant and an amphoteric additive, the pH of the emulsion being equal or approximately equal to the iso-electric point of the amphoteric additive.

2. Composition according to claim 1 in which the amphoteric additive comprises one or more particulate materials pre-treated with an amphoteric surfactant, wherein the primary surfactant is constituted by the amphoteric surfactant, or the amphoteric surfactant is in addition to the primary surfactant.

3. Composition according to claim 2 comprising submicron pigment particles reacted with an amphoteric surfactant.

4. Composition according to claim 2 comprising an inert filler pretreated with an amphoteric surfactant.

5. Composition according to claim 2 wherein said particulates have been pretreated with a rheology modifier.

6. Composition according to claim 1, in which the amphoteric additive comprises one or more pigments and/or fillers having a zero point of charge.

7. Composition according to claim 6, in which the pigment(s) or filler(s) is/are surface activated.

8. Composition according to claim 1, in which said oil is creosote.

9. Process for preparing a composition for impregnating porous materials, the process comprising forming an emulsion of water and oil containing a primary surfactant and an amphoteric additive and adjusting the pH of the emulsion to be equal or approximately equal to the iso-electric point of the amphoteric additive.

10. A process for preserving timber which comprises impregnating the timber with a composition containing at least one component having preservative properties or which releases a component having preservative properties upon heating, said composition comprising an emulsion of water and oil containing a primary surfactant and an amphoteric additive wherein said emulsion has a pH which is equal to or approximately equal to the iso-electric point of the amphoteric additive.

11. A process for preserving timber according to claim 10 wherein the amphoteric additive comprises one or more particulate materials pre-treated with an amphoteric surfactant, wherein the primary surfactant is constituted by the amphoteric surfactant, or the amphoteric surfactant is in addition to the primary surfactant.

12. A process for preserving timber according to claim 11 wherein said on further includes sub-micron pigment particles reacted with an amphoteric surfactant.

13. A process for preserving timber according to claim 11 wherein said composition further includes an inert filler pretreated with an amphoteric surfactant.

14. A process for preserving timber according to claim 11 wherein said on further includes said particulates which have been pretreated with a rheology modifier.

15. A process for preserving timber according to claim 10 wherein said amphoteric additive comprises one or more pigments and/or fillers having a zero point of charge.

16. A process for preserving timber according to claim 15 wherein said pigments and/or fillers are surface activated.

17. A process for preserving timber according to claim 10 wherein said oil is creosote.

* * * * *